(12) United States Patent
Hay et al.

(10) Patent No.: US 11,803,838 B2
(45) Date of Patent: Oct. 31, 2023

(54) APPLICATION MANAGEMENT FOR SIMULATED CONTACTLESS PAYMENT CARDS

(71) Applicant: MASTERCARD INTERNATIONAL INCORPORATED, Purchase, NY (US)

(72) Inventors: Florent Hay, Laeken (BE); Patrick Mestre, Sart-Bernard (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 491 days.

(21) Appl. No.: 17/025,215

(22) Filed: Sep. 18, 2020

(65) Prior Publication Data

US 2021/0090070 A1    Mar. 25, 2021

Related U.S. Application Data

(60) Provisional application No. 62/902,614, filed on Sep. 19, 2019.

(51) Int. Cl.
*G06Q 20/34* (2012.01)
*G06Q 20/20* (2012.01)
(Continued)

(52) U.S. Cl.
CPC ....... *G06Q 20/3567* (2013.01); *G06F 3/0604* (2013.01); *G06F 3/0655* (2013.01);
(Continued)

(58) Field of Classification Search
CPC ............. G06Q 20/3567; G06Q 20/202; G06Q 20/204; G06F 3/0604; G06F 3/0655; G06F 3/0679; G06F 8/61; G06F 9/547
See application file for complete search history.

(56) References Cited

U.S. PATENT DOCUMENTS

| 8,196,131 B1 * | 6/2012 | von Behren | ......... G06Q 20/382 |
| | | | 705/64 |
| 8,799,087 B2 * | 8/2014 | Martin | ................... G06Q 20/20 |
| | | | 705/16 |

(Continued)

FOREIGN PATENT DOCUMENTS

WO    WO-2016048863 A1 *  3/2016  ............. G06Q 20/10

OTHER PUBLICATIONS

Urien et al. "Secure mobile payments based on cloud services: Concepts and experiments." 2016 IEEE 2nd International Conference on Big Data Security on Cloud, IEEE International Conference on High Performance & Smart Computing, & IEEE International Conference on Intelligent Data & Security. IEEE, 2016 (Year: 2016).*

(Continued)

*Primary Examiner* — Asfand M Sheikh
(74) *Attorney, Agent, or Firm* — Talem IP Law, LLP

(57) ABSTRACT

Application management services for simulated contactless cards support applying payment when a provisioned card (cardholder profile) is stored in volatile memory of a computing device by maintaining a first channel open between a payment application and a provisioning service while communicating payment information to a point of sale terminal over a second channel.

15 Claims, 5 Drawing Sheets

(51) Int. Cl.
   *G06Q 20/38*   (2012.01)
   *G06F 8/61*    (2018.01)
   *G06F 3/06*    (2006.01)
   *G06F 9/54*    (2006.01)
   *G06Q 20/40*   (2012.01)

(52) U.S. Cl.
   CPC .............. *G06F 3/0679* (2013.01); *G06F 8/61* (2013.01); *G06F 9/547* (2013.01); *G06Q 20/202* (2013.01); *G06Q 20/204* (2013.01); *G06Q 20/385* (2013.01); *G06Q 20/206* (2013.01); *G06Q 20/40145* (2013.01)

(56) References Cited

U.S. PATENT DOCUMENTS

| | | | | |
|---|---|---|---|---|
| 9,071,963 | B2* | 6/2015 | Khan | H04B 5/0031 |
| 11,107,067 | B2* | 8/2021 | Dao | G06Q 30/0233 |
| 2003/0221079 | A1* | 11/2003 | Saltz | G06F 12/0238 |
| | | | | 711/170 |
| 2006/0101301 | A1* | 5/2006 | Nagao | G11C 7/24 |
| | | | | 713/600 |
| 2008/0058014 | A1* | 3/2008 | Khan | H04L 63/0853 |
| | | | | 455/558 |
| 2011/0239304 | A1* | 9/2011 | Saarisalo | G06Q 20/401 |
| | | | | 726/26 |
| 2012/0109764 | A1* | 5/2012 | Martin | G06Q 20/20 |
| | | | | 705/17 |
| 2013/0124349 | A1* | 5/2013 | Khan | G06Q 20/322 |
| | | | | 705/41 |
| 2014/0058937 | A1* | 2/2014 | Watson | G06Q 20/425 |
| | | | | 705/41 |
| 2015/0012921 | A1* | 1/2015 | Lettow | G06Q 10/06 |
| | | | | 718/102 |
| 2015/0339664 | A1* | 11/2015 | Wong | G06Q 20/4015 |
| | | | | 705/71 |
| 2016/0027002 | A1* | 1/2016 | Choi | G06Q 20/3229 |
| | | | | 705/41 |
| 2016/0140535 | A1* | 5/2016 | Noe | G06Q 20/405 |
| | | | | 705/39 |
| 2016/0140545 | A1* | 5/2016 | Flurscheim | H04L 63/0838 |
| | | | | 705/76 |
| 2016/0266943 | A1* | 9/2016 | Hans | G06F 9/54 |
| 2017/0017951 | A1* | 1/2017 | Lee | G06Q 20/202 |
| 2017/0055109 | A1* | 2/2017 | Van Nieuwenhuyze | H04W 4/80 |
| 2018/0349888 | A1* | 12/2018 | Dao | G06Q 20/367 |
| 2021/0090070 | A1* | 3/2021 | Hay | G06Q 20/202 |

OTHER PUBLICATIONS

"International Search Report and Written Opinion Issued in International Patent Application No. PCT/US2020/051374", dated Dec. 29, 2020, 7 Pages.

* cited by examiner

APPLICATION MANAGEMENT FOR SIMULATED CONTACTLESS PAYMENT CARDS

CROSS-REFERENCE TO RELATED APPLICATION

This application claims the benefit of U.S. Provisional Patent Application Ser. No. 62/902,614, filed Sep. 19, 2019.

BACKGROUND

A contactless card is usually dedicated to a single user. An issuer provisions (customizes) a card for a particular cardholder and the card is then issued to the cardholder, with the personalization credentials stored in a secure element. The personalization credentials include a personal account number (PAN) along with keys unique to the cardholder. These data remain unchanged during the card lifetime and so do not need to be updated on a transaction basis. The secure element includes a persistent memory (e.g., a non-volatile memory such as EEPROM) in which the personalization credentials are stored. The personalization credentials are usually only updated when the card expires, thus not very often.

BRIEF SUMMARY

Application management services for simulated contactless cards are described. The application management services support applying payment when a provisioned card (cardholder profile) is stored in volatile memory of a computing device.

The described application management services provide a mechanism in which a primary account number (PAN) and other customer specific payment information is held on volatile memory during the time of the payment/communication between a simulated contactless card and a point of sale (POS) terminal (contactless terminal) receiving payment.

New application programming interfaces (APIs) are also provided that support a proximity payment system environment (PPSE) update since PPSE is typically static.

In certain embodiments, an application management service of a multi-user simulated contactless payment card application maintains a first channel open at a computing device implementing a simulated contactless card. The application management service can receive payment card profile information through the first channel; and store the payment card profile information in a first volatile memory. If the payment card profile information includes a new PPSE entry, the application management service can update a PPSE response in a second volatile memory with the received new PPSE entry. If the payment card profile information does not include the new PPSE entry, the application management service can update the PPSE response in the second volatile memory with a default PPSE entry stored in a non-volatile memory. The application management service can communicate, through a second channel, payment information including the updated PPSE response to a POS terminal.

The application management service enables many customers to use the same device/application for simulating their contactless payment card, and particularly, to avoid storing payment information in the non-volatile memory of the system (and therefore avoids the memory degradation issues associated with current non-volatile memory).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Application management services for simulated contactless cards are described. The application management services support applying payment when a provisioned card (cardholder profile) is stored volatile memory of a computing device.

The described application management services provide a mechanism in which a primary account number (PAN) and other customer specific payment information is held on volatile memory during the time of the payment/communication between a simulated contactless card and a point of sale (POS) terminal (contactless terminal) receiving payment. It should be understood that, although reference is made to a POS system, the implementation of the system may be akin to any point of interaction (POI) terminal or other interface for payment.

The application management service enables many customers to use the same device/application for simulating their contactless payment card, and particularly, to avoid storing payment information in the non-volatile memory of the system (and therefore avoids the memory degradation issues associated with current non-volatile memory).

The simulated contactless payment cards can provide multiple temporary profiles and corresponding credentials. Indeed, instead of loading a consumer application and credentials persistently in a consumer device and exposing the user to have their cards always on them, the customer's cards can be managed in the cloud and downloaded "on demand" for a temporary use when the customer needs to use their payment card for a transaction. Once the payment transaction is completed, the temporary card is deleted. The temporary card is configured to perform a single payment transaction, which inhibits theft in the case that the downloaded credentials are captured by a rogue device.

Figure 1:
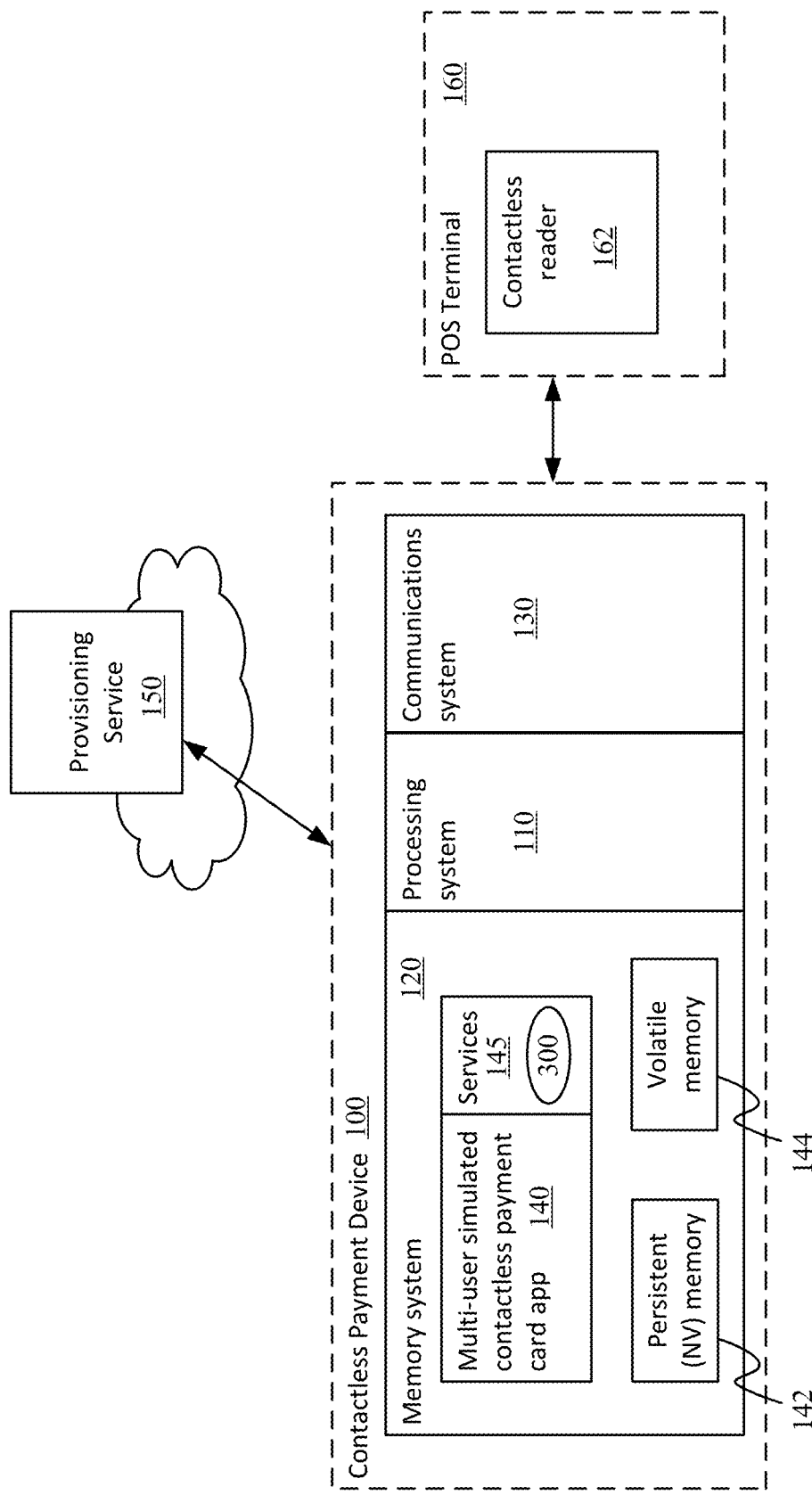
FIG. 1 illustrates an example operating environment for simulated contactless payment cards providing multiple temporary files and corresponding credentials.

FIG. 1 illustrates an example operating environment for simulated contactless payment cards providing multiple temporary files and corresponding credentials. Referring to FIG. 1, an operating environment can include a contactless payment device 100, provisioning service 150, and a POS terminal 160 with contactless reader 162. The contactless payment device 100, which may be in the form of a dongle or integrated with the POS system 160, can include a processing system 110 (e.g., processor), a memory system 120 (e.g., storage device), and a communications system 130. When the contactless payment device 100 is in the form of a dongle, there is no change to the merchant terminal infrastructure itself, just the addition of the dongle in front of the contactless reader 162 or in another position which can help maintain the contactless payment device 100 in position at the merchant's contactless reader 162. The dongle can thus act as a contactless card for use by any customer. The dongle does not need to make physical contact with the merchant terminal/POS system 160 so long as the dongle is able to be in communication with a contactless card reader 162 of the merchant terminal/POS system 160. The contactless payment device 100 can remain in this position and is used for all transactions, whoever the customer paying.

The processing system 110 can include any suitable processing devices ("processors"), such as a microprocessor, central processing unit (CPU), graphics processing unit (GPU), field programmable gate arrays (FPGAs), application-specific integrated circuits (ASICs), logic circuits, and state machines.

The memory system 120 can include volatile (e.g., dynamic random access memory (DRAM), static random access memory (SRAM)) and non-volatile memory (e.g., flash, magnetic random access memory (MRAM, FeRAM)). The memory of memory system 120 may be removable or non-removable.

Figure 2A:
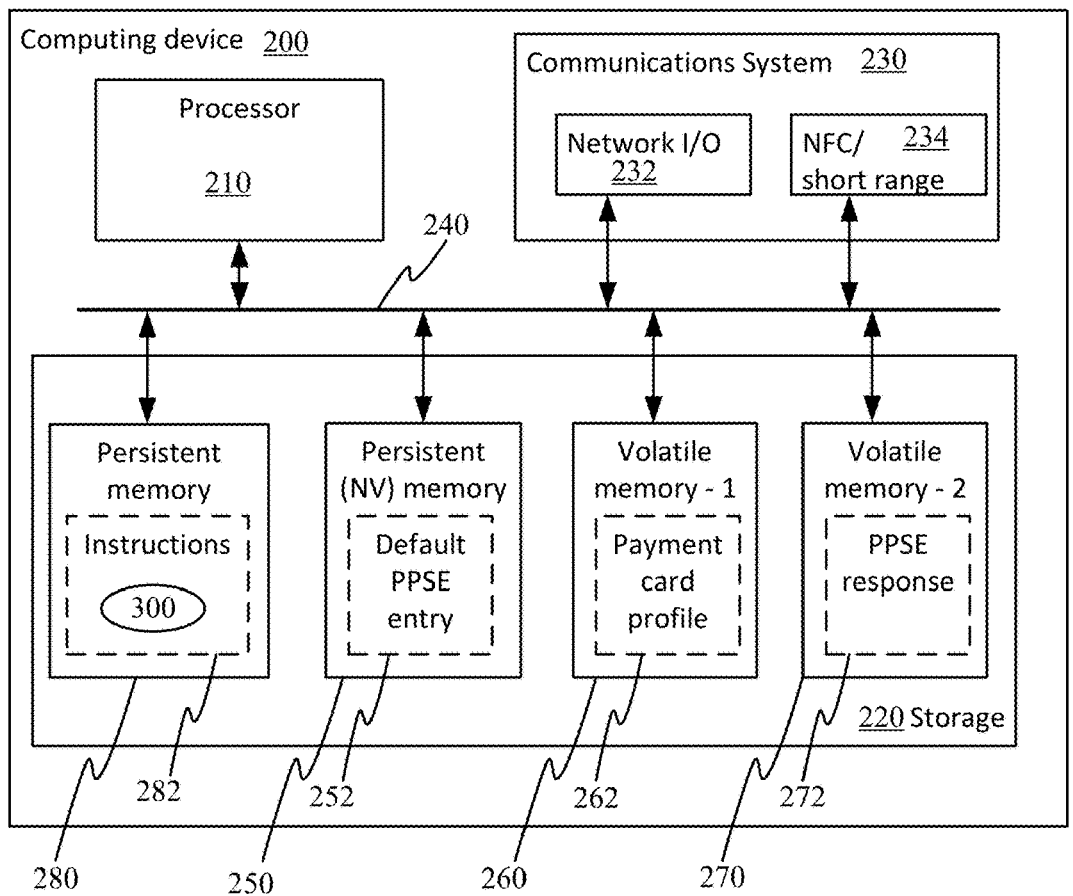
FIGS. 2A and 2B illustrate representational diagrams of a computing device operating an application management service of a multi-user simulated contactless payment card application.

Memory system 120 at least includes a non-volatile memory 142 and a volatile memory 144. It should be noted that although one nonvolatile memory 142 and one volatile memory 144 are shown, the contactless payment device 100 may utilize one or more memory circuits/chips for that memory type. For example, as illustrated in FIG. 2A, a non-volatile memory 250 and two volatile memories 260, 270 may be provided. The contactless payment device 100 can include a secure element that includes a secure memory and, optionally, logic (e.g., for cryptographic operations or other sensitive operations). The secure memory may be volatile memory, non-volatile memory, or include both types of memory. In some cases, nonvolatile memory 142 and/or volatile memory 144 are part of the secure memory.

As illustrated in the example of FIG. 1, the memory system 120 stores a multi-user simulated contactless payment card application 140. The application 140 may be stored in any suitable type of memory of the memory system 120. Included as part of application 140 or as stand-alone services stored in the memory system 120 are instructions for application management services 145 (and corresponding application programming interfaces (APIs)). Application management services 145 can carry out application management process 300, such as described with respect to FIG. 3.

Communications system 130 includes the interfaces and logic for communicating over various networks such as via short range wireless connectivity (e.g., near field communication (NFC)), via radio frequency protocols (e.g., Bluetooth, Wi-Fi using IEEE standards 802.11, cellular data protocols using GSM, CDMA, 3G, 4G, 5G etc., satellite), and via wired connections (e.g., ethernet). The particular types of communications available via communications system 130 depends on implementation.

Communications system 130 enables contactless payment device 100 to communicate with a provisioning service 150, which can provide the appropriate one-time use credentials for the customer, and to communicate with a point of sale terminal 160 (when not integrated as part of the point of sale terminal) for the transaction.

The contactless payment device 100 equipped with a secure element (including non-volatile memory 142) can be located within a communication distance to a merchant's contactless reader 162 of the point of sale terminal 160. Instead of each individual user having their own contactless payment device, the contactless payment device 100 is available for use by any customer.

Unlike in the conventional contactless payment device or card, which belongs to a specific cardholder and can store credentials in the secure element/non-volatile memory, the described contactless payment device 100 is used for effectively any customer.

In operation, when a customer wants to pay, the customer is first identified by the contactless payment device 100 or an identification device (e.g., a palm reader) (not shown), for example, using biometrics or some other mechanism that can identify (and optionally authenticate) a customer. Once the customer is identified, the device 100 is personalized so as to behave like a contactless card (or mobile application) of this customer and the payment can take place.

The provisioning service 150 is provided to support multiple temporary profiles and corresponding credentials on the contactless payment device 100. To provision the contactless payment device 100 with cardholder's specific data (card profile data including PAN and keys—and other EMV data), the contactless payment device 100 uses the provisioning service 150. The contactless payment device 100 (e.g., directed by the multi-user simulated contactless payment card application 140 and managed by services 145) calls the provisioning service 150 and the provisioning service 150 sends the card details (PAN, keys, other EMV data such as card country code, currency code, certificates, etc.) to the contactless payment device 100 in response to the request. The keys that will be used for the transaction are single use, and they can only be used for one transaction. This is to be opposed to a conventional secure element implementation where the personalized keys are usually the card master keys that are multi use.

Accordingly, to avoid degrading a secure element's persistent memory (e.g., non-volatile memory 142) and improve usability of the secure element (such as provided by contactless payment device 100), cardholder profiles are stored temporarily in volatile memory, such as volatile memory 144, which does not have the same limitation on the number of writing cycles before the memory becomes irremediably damaged. In addition, whenever there is a transaction (which requires provisioning of a cardholder profile), no writing is required to persistent memory (e.g., non-volatile memory 142).

Figure 2B:
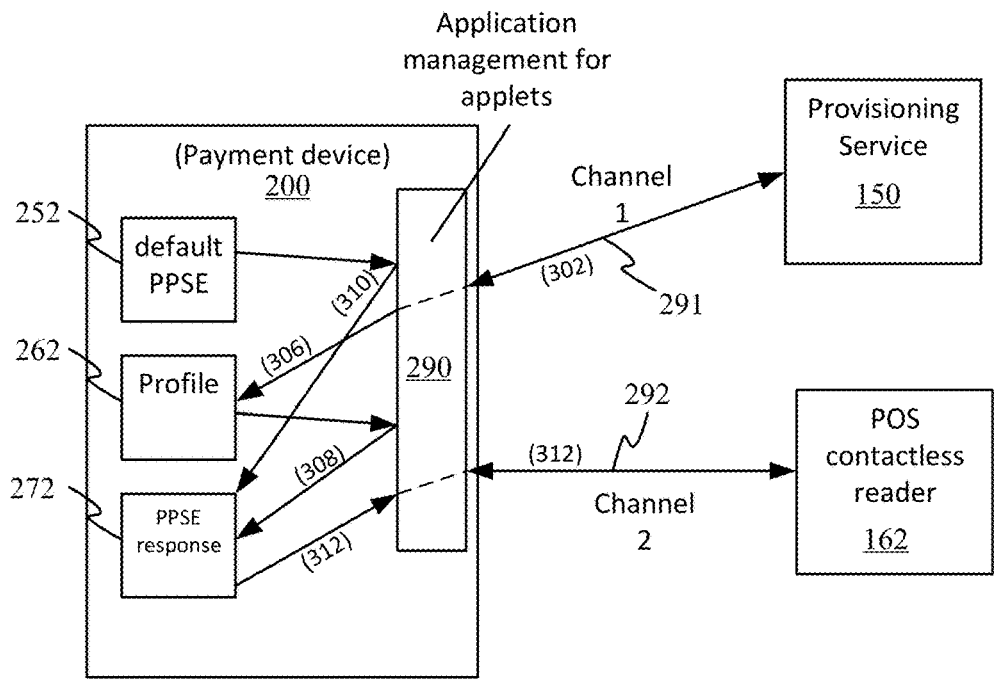

FIGS. 2A and 2B illustrate representational diagrams of a computing device operating an application management service of a multi-user simulated contactless payment card application.

A payment device such as device 100 of FIG. 1 can be embodied by computing device 200. Referring to FIGS. 2A and 2B, computing device 200 can include a processor 210, storage 220, and a communications system 230 coupled, for example, via a system bus 240. Processor 210 can include one or more of any suitable processing devices ("processors"), such as a microprocessor, central processing unit (CPU), graphics processing unit (GPU), field programmable gate arrays (FPGAs), application-specific integrated circuits (ASICs), logic circuits, and state machines. Storage 220 can include non-volatile memory 250, a first volatile memory 260, a second volatile memory 270, and a persistent (e.g., non-volatile) memory 280 storing instructions 282 for a multi-user simulated contactless payment card application (e.g., application 140) and application management services (e.g., services 145) carrying out process 300 of FIG. 3. Communications system 230 can include a network interface 232 for coupling to an Internet or cellular service (for communicating with provisioning service 150) and a short range interface 234 (near field, wide band, or other common communication protocols) that can be used to communicate with a contactless reader 162.

In some cases, the instructions 282 for the multi-user simulated contactless payment card application (e.g., application 140 of FIG. 1) can be implemented as part of a smart card computing environment, such as the Java Card Platform, on which an applet (for the multi-card user simulated payment card) is run. In such a case, the persistent memory 280 is part of the secure memory of a computing device/card. In the smart card computing environment, there are two forms of transient memory that are supported:

CLEAR_ON DESELECT memory: the data are kept in volatile memory (e.g., first volatile memory 260) while the application remains selected. That memory is cleared when the application is deselected.

CLEAR_ON_RESET memory: the data are kept in volatile memory (e.g., second volatile memory 270) while the secure element remains powered on. That memory is reset once the secure element is rebooted. The amount of such memory is declared at the application installation and is limited per application.

For contactless payment devices that are implemented with a computing environment such as the Java Card Platform, the cardholder profile 262 can be stored in volatile memory (e.g., first volatile memory 260) using CLEAR_ON_DESELECT memory.

The first volatile memory 260 and the second volatile memory 270 may be the same or different forms of volatile memory. For example, the first volatile memory 260 may be CLEAR_ON_DESELECT memory and the second volatile memory 270 may be CLEAR_ON_RESET memory.

Generally, when a contactless payment is being carried out, a merchant terminal selects the proximity payment system environment (PPSE) application on the consumer device to determine the payment application to use. This selection causes the current payment application selected on the internal interface to be deselected and consequently would cause the loss of any personal data. Then, the merchant terminal selects the payment application to perform the payment.

Because the selection of the PPSE application deselects the payment card application (e.g., the previous payment application that was selected), anything stored from a provisioning selection session in CLEAR_ON_DESELECT memory will be lost. Therefore, if payment information is stored on the volatile memory such as CLEAR_ON-DESELECT memory, this information would be lost and no transaction would be able to take place.

With reference to FIG. 1 and FIG. 2B, application management services 145/290 for a contactless payment device such as contactless payment device 100 of FIG. 1 and device 200 of FIGS. 2A and 2B can support the multi-user simulated contactless payment card application 140 and storage of credentials in volatile memory 144 (e.g., first volatile memory 260 and second volatile memory 270) by using multiple logical channels.

The logical channels are available such as described in the European Telecommunications Standards Institute (ETSI) standards often provided for use with payments via mobile devices. Channels allow multiple applications to be selected simultaneously on the secure element. That means that the selection of the PPSE will not de-select the payment application on the secure element and so the card details will not be lost and can be used for the upcoming transaction.

As an example, personalization data (including records content) can be received from a first logical channel 291 and stored in global CLEAR_ON_DESELECT memory (e.g., first volatile memory 260) instead of in persistent memory (e.g., non-volatile memory 250). A second logical channel 292 is then used by the merchant terminal to select the PPSE application such that the payment card application remains selected on first logical channel (and therefore not suffer the loss of data on the volatile memory from deselection of the payment card application). The personalization data (e.g., payment card profile 262) can then be flushed at the end of every contactless transaction happening on a second logical channel 292, for example, at the end of a GENERATE_AC command processing.

The application management service 145/290 can allow for multiple sessions of the payment application 140 (or applets such as personalization manager, payment applet, and PPSE applet) to run simultaneously. For example, one session may be used for the provisioning and another session used for the payment. If they run simultaneously (again using logical channels), then the session used for the provisioning can remain "permanently" open (in fact as long as it is not de-selected). This allows to optimize the provisioning as the first steps are used to establish a secure channel. If the secure channel is already set up for the next provisioning (e.g., a new first logical channel), then the provisioning process is faster. To implement this feature, a payment applet of the multi-user simulated contactless payment card application is multi-selectable.

As previously described, card details (specifically a user's credentials) stored for the simulated contactless payment card are single use. That is, card details are only downloaded for one transaction. Therefore, when the transaction is completed, the applet can automatically clear the card details that were used for this transaction from the volatile memory. In some cases, the card profile (e.g., a digital PAN/token) is the same for every payment with the credentials changing per user and everything is erased at the end of every payment.

New APIs are also provided that support a PPSE update since PPSE is typically static. The PPSE is a registry that lists all payment applications present on the consumer device and is able to be communicated in a single exchange to a merchant terminal. The PPSE is generally static and is rarely to never updated unless a user installs/activates or uninstalls/inactivates a payment application. Not only is a multi-user simulated contactless payment card application 140 provided, techniques (e.g., management services 145) and APIs are also described that enable the PPSE to update more regularly and also not store the PPSE content in persistent memory, but instead store the PPSE content in volatile memory in order to avoid the damage to the persistent memory from the continual updates.

During a conventional set-up/provisioning for the user's payment application, a conventional contactless payment device receives a PPSE entry related to the user's payment application that will be returned by the PPSE application, when the PPSE is selected. This entry received during the original provisioning/personalization of the user's payment application is also stored in the GP (CL) registry of the secure element. This allows the PPSE application to directly fetch the payment application entry to be presented to the terminal, from the GP (CL) registry entry, without the need for a direct interaction between the PPSE application and every payment application installed onto the secure element. This is another area where, if the multi-user contactless payment device is having to update the PPSE entry for each user, the non-volatile memory may become fatally damaged (particularly the GP (CL) registry locations). Accordingly, a method is provided where the PPSE application populates its response based on dynamic information provided by the system.

During an initialization of a payment application and payment card device, a default PPSE entry can be established and stored in the non-volatile memory of the payment card device. The payment method can then select to use the default PPSE entry or a new entry received with payment credentials for a particular user (that is stored in volatile memory) based on the dynamic information provided by the system.

Figure 3:
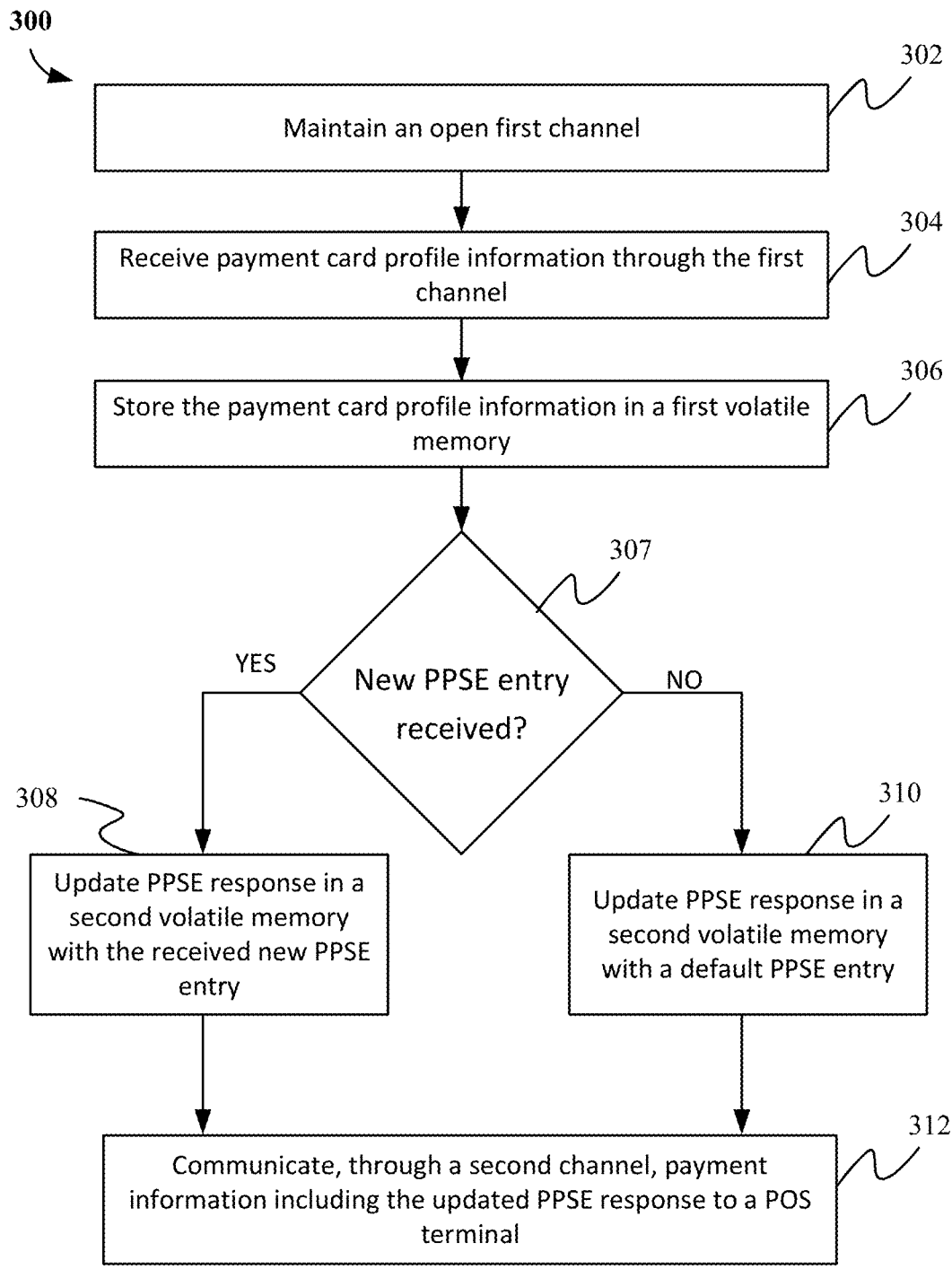
FIG. 3 illustrates an example process carried out by a payment card device for application management of simulated contactless cards.
Figure 4:
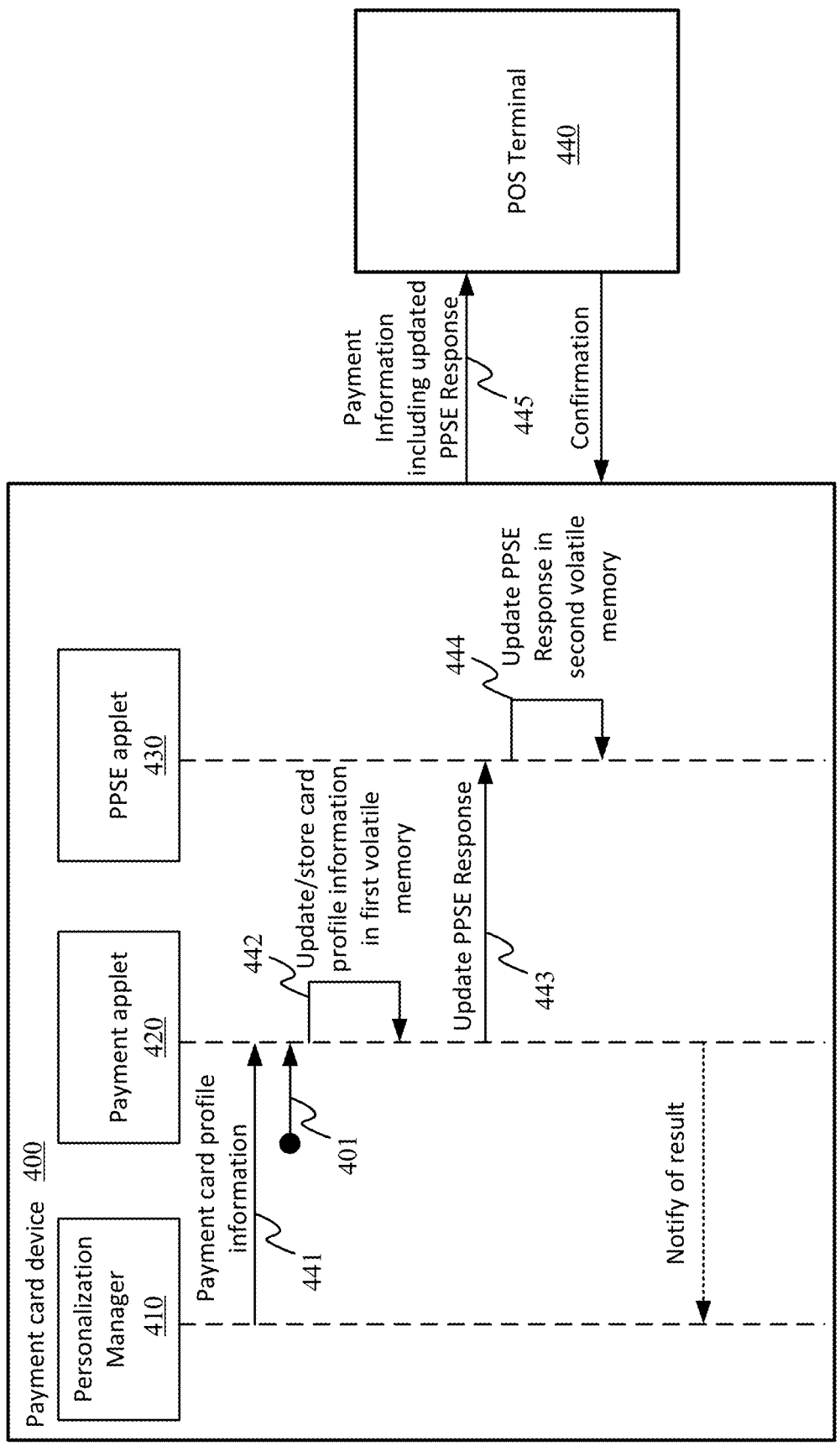
FIG. 4 illustrates an operating environment and processes for application management of contactless payments when supporting multiple temporary profiles and corresponding credentials.

FIG. 3 illustrates an example process flow diagram for application management of simulated contactless cards; and FIG. 4 illustrates an operating environment and processes for application management of contactless payments when supporting multiple temporary profiles and corresponding credentials.

With reference to FIG. 2B and FIG. 3, through the application management process 300, a single payment card device (e.g., device 100 of FIG. 1 or device 200 of FIGS. 2A and 2B) can be used for multiple users and transactions without adversely degrading the persistent memory.

In operation, the payment card device can maintain (302) an open first channel (see first channel 291 of FIG. 2B). The first channel 291 may be a logical channel. The first channel 291 may be maintained as open for the active state of the payment application (e.g., application 140 of FIG. 1).

The payment card device can receive (304) payment card profile information through the first channel (via communication between the payment application 140 and a provisioning service such as provisioning service 150 of FIG. 1); and store (306) the payment card profile information in a first volatile memory (e.g., as profile 262 stored in first volatile memory 260 of FIGS. 2A-2B). In some cases, the payment card profile information includes a new PPSE entry. In some cases, the payment card profile information does not include a new PPSE entry. Thus, when the payment card profile information is received, a determination (307) can be made if a new PPSE entry was received.

In some cases, with reference to FIG. 4, a personalization manager 410 of the payment application for the payment card device 400 can receive the payment card profile information and communicate (441) the payment card profile information to a payment applet 420 for the payment application, which updates/stores (442) the card profile information in the first volatile memory and updates (443) the PPSE response for the PPSE applet 430 using a PPSE response provided with the payment card profile information from the personalization manager 410 or a default PPSE response 401 attached to the particular card (e.g., default PPSE 252 stored in non-volatile memory 250) if not provided by the personalization manager 410. The PPSE applet 430 stores (444) the PPSE response (either the one provided by the personalization manager 410 or the default PPSE response 401) in a second volatile memory (e.g., as PPSE response 272 in second volatile memory 270 of FIGS. 2A-2B). As described with respect to FIG. 5, communication between the applets may include the new PPSE APIs.

Returning to FIG. 3, if the payment card profile information includes a new PPSE entry, the payment card device can update (308) the PPSE response in the second volatile memory (e.g., PPSE response 272 in the second volatile memory 270 of FIGS. 2A-2B) with the received new PPSE entry (e.g., from personalization manager 410). If the payment card profile information does not include the new PPSE entry, the payment card device can update (310) the PPSE response in the second volatile memory with a default PPSE entry (e.g., default PPSE response 401, 252). The default PPSE entry may be stored in secure memory, such as persistent memory of the payment card device in the form of non-volatile memory (e.g., non-volatile memory 142 of FIG. 1 and non-volatile memory 250 of FIG. 2A).

Referring to FIG. 2B, FIG. 3, and FIG. 4, the payment card device 400 can communicate (312) (445), through a second channel on which the PPSE applet 430 is active, payment information including the updated PPSE response to a POS terminal 440 (see also second channel 292 of FIG. 2B).

During the application management process (e.g., controlled by application management services), the payment applet (e.g., payment applet 420) remains in ACTIVATED contactless availability state, whether it is personalized or not (to avoid multiple write cycles of the GP contactless registry). The PPSE only exposes the application that has been personalized and will be used for the immediate payment. For cases where for any reason the payment applet is selected while there are no card details, the contactless payment will be declined.

The standard PPSE management uses EMVCo, an "internal mode" involving activating/deactivating an application and notifying the PPSE to dynamically update the response accordingly. However, as previously mentioned, rewriting PPSE entries in the persistent GP contactless registry of a payment application for each transaction by using the EMVCo standard can damage the memory.

The solution can be a manual update process carried out at the payment card device (e.g., by one of the management services 145 of FIG. 1) or a process performed by the payment application itself using a shareable interface object (SIO) exposed by the PPSE application.

The manual update process can entail a payment card manager (software component) that receives a PPSE file control information (FCI) to be personalized for a customer (which can be part of a profile provided by the provisioning service 150 of FIG. 1). After personalization of the payment applet using the received profile and PPSE FCI, the payment card manager selects the PPSE applet and provides, directly to the PPSE, the directory of entry of the payment applet that will be returned to a merchant terminal. The PUT TEMPLATE command documented by the EMVCo standard may be used for this purpose, where the command is modified to directly receive the complete FCI template to match what is currently available in the customer profile (and not only the FCI Proprietary Template).

Figure 5:
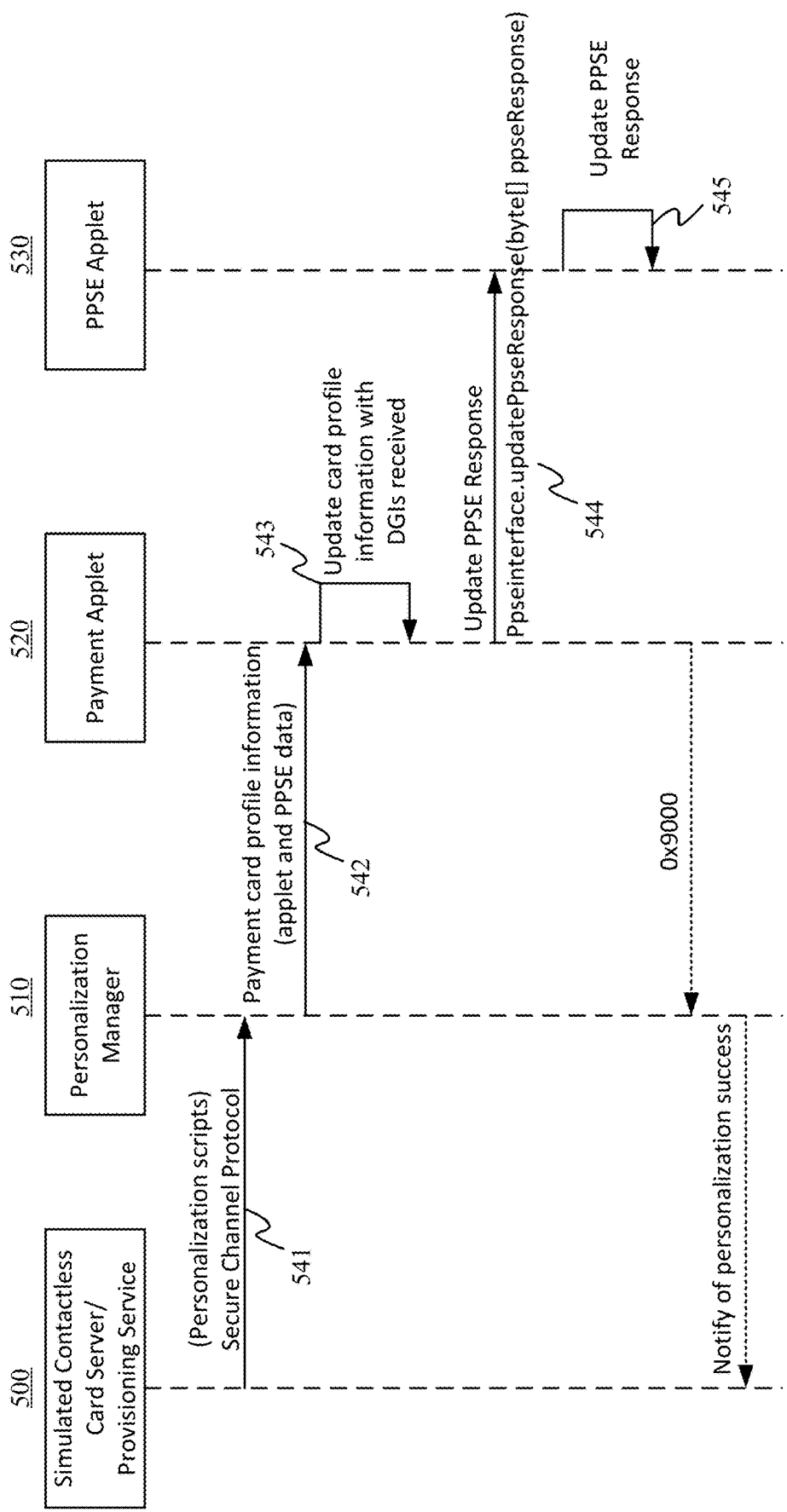
FIG. 5 illustrates example processes for a dynamic PPSE update using a shareable interface object (SIO) for application management of contactless payments when supporting multiple temporary profiles and corresponding credentials.

The process performed by the payment application (e.g., payment application 140 of FIG. 1) is described with respect to FIG. 5 and includes new APIs, which are provided that support a PPSE to update more regularly.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. An API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. The API-calling component may be a local component (i.e., on the same data processing system as the API-implementing component) or a remote component (i.e., on a different data processing system from the API-implementing component) that communicates with the API-implementing component through the API over a network.

FIG. 5 illustrates example processes for a dynamic PPSE update using a shareable interface object (SIO) for application management of contactless payments when supporting multiple temporary profiles and corresponding credentials. The operating environment illustrated in FIG. 5 includes a simulated contactless card server 500 which may be or at least acts as a proxy to, or in conjunction with, a provisioning service such as provisioning service 150 described with respect to FIG. 1. The components at the contactless payment device include a personalization manager 510, payment applet 520, and PPSE applet 530. The example flow may be used for all payment applications present on the payment device that have access to a "standard" shareable interface object (SIO) exposed by the PPSE applet 530, which allows the payment applications to update the PPSE response during the personalization cycle of the payment applet 520.

System-specific parameters can be provided at the installation of the payment applet 520 and should activate the payment applet 520 over the contactless interface by default. A default entry may be configured in the payment applet 520 at the installation stage of the payment application. Indeed, it is time consuming to always reload the PPSE entry for every transaction (since new card details are loaded for every transaction when using a multi-user simulated contactless card). The time spent to load new card details is preferred to be as short as possible (to optimize the payment sequence and provide a satisfying user experience—once the user is authenticated, it is desirable to minimize the time waiting before the user can pay at the Point Of Sale).

Because a payment application will likely receive the same PPSE entry most of the time that will contain standard information about a specific payment card product, configuring a default entry to be used when no new PPSE entry is communicated by the server can optimize the provisioning process.

This standard PPSE entry for the specific payment card product is communicated to the payment application during the application installation onto the secure element of the payment device (which is performed only once during the product lifecycle). All payment cards from any customer (from the specific payment card product) will then be "loaded" with this specific payment card product identification.

This PPSE entry (the "default PPSE") is part of the Installation parameters that may be communicated into the INSTALL [for install] command.

During the described flow, the payment applet 520 should always remain in ACTIVATED contactless availability state, whether it is personalized or not (to avoid multiple write cycles of the GP contactless registry). This can be managed, for example, by application management service 145 described with respect to FIG. 1. The PPSE (via PPSE applet 530) should only expose the application that has been personalized and will be used for the immediate payment. If for any reason the payment applet 520 is selected while the payment applet 520 does not have card details, the instance is not usable and the contactless payment would be declined.

The PPSE applet provides a new API, calling a method updatePpseResponse( ). This new API is exposed by the PPSE applet to all payment applets and would be called by the payment applet at the end of the personalization cycle, when receiving a data grouping identifier (DGI) that contains the PPSE FCI (file control information). In general, the PPSE API is callable by the payment application after the payment card profile information is received from the provisioning service through the first channel. For example, with reference to FIG. 5, a customer's profile can be received (541) from the simulated contactless card server 500 and provided (542) from the personalization manager 510 to the payment applet 520, which updates (543) the card profile information. The PPSE data is sent (544) to the PPSE applet, which updates (545) the PPSE response.

During a card provisioning (e.g., at step 541), when a user has been authenticated, there can be two situations. In the first situation, the simulated contactless card server 500 does not send a new PPSE entry. In this case, the payment application will then use its default PPSE entry from its persistent memory and will send (e.g., at step 544) the default PPSE entry to the PPSE application using the shareable interface described in this section.

In the first situation, the simulated contactless card server 500 does send a dedicated PPSE entry: In that case, the payment application 520 will not use its default PPSE entry, but will use the PPSE entry value received during the provisioning sequence instead, and will send (e.g., at step 544) the PPSE entry to the PPSE application using the shareable interface (of the new API).

Example Method and Description of the update PPSE Response includes:

updatePpseResponse ( )
public void updatePpseResponse (byte [ ] ppseResponse)
Description This API is exposed by the PPSE application to all payment applications present onto the secure element. This method updatePpseResponse( ) allows any payment application on the secure element to update the PPSE response.

Parameter
byte[ ] ppseResponse
Method Processing

The Global Transient Data declared as a CLEAR_ON_RESET transient data is updated with the parameter ppseResponse.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A computing device comprising:
a processor;
a storage device, the storage device having a first volatile memory, a second volatile memory, and a non-volatile memory, the non-volatile memory storing a default proximity payment system environment (PPSE) entry; and
instructions stored in the storage device that when executed by the processor, direct the computing device to:
provision a payment application on a first channel;
maintain the first channel as open for the payment application;
receive payment card profile information through the first channel;
store the payment card profile information in the first volatile memory;
determine whether the payment card profile information includes a new PPSE entry or does not include the new PPSE entry;
if the payment card profile information includes a new PPSE entry, update a PPSE response in the second volatile memory with the new PPSE entry;
if the payment card profile information does not include the new PPSE entry, update the PPSE response in the second volatile memory with the default PPSE entry; and
communicate, through a second channel and while the first channel is maintained as open for the payment application, payment information including the updated PPSE response to a POS terminal.

2. The computing device of claim 1, wherein the first volatile memory is a CLEAR_ON_DESELECT transient memory and the second volatile memory is a CLEAR_ON_RESET transient memory.

3. The computing device of claim 1, wherein the instructions further direct the computing device to:
install the payment application onto a secure element of the storage device, the payment application associated with a specific payment card product;
receive the default PPSE entry for the specific payment card product; and
store the default PPSE entry in the non-volatile memory.

4. The computing device of claim 1, wherein the first channel is maintained open between a provisioning service and the payment application.

5. The computing device of claim 4, further comprising instructions for a PPSE application programming interface (API) that directs the PPSE response in the second volatile memory to be updated with the new PPSE entry, the PPSE API being callable by the payment application after the payment card profile information is received from the provisioning service through the first channel.

6. A storage medium having instructions for application management for simulated contactless cards service stored thereon that when executed by a processor, direct a computing device providing a contactless payment device to:
provision a payment application on a first channel;
maintain the first channel as open for the payment application;
receive payment card profile information through the first channel;
store the payment card profile information in a first volatile memory;
determine whether the payment card profile information includes a new proximity payment system environment (PPSE) entry or does not include the new PPSE entry;
if the payment card profile information includes a new PPSE entry, update a PPSE response in a second volatile memory with the new PPSE entry;
if the payment card profile information does not include the new PPSE entry, update the PPSE response in the second volatile memory with a default PPSE entry; and
communicate, through a second channel and while the first channel is maintained as open for the payment application, payment information including the updated PPSE response to a POS terminal.

7. The storage medium of claim 6, wherein the first volatile memory is a CLEAR_ON_DESELECT transient memory and the second volatile memory is a CLEAR_ON_RESET transient memory.

8. The storage medium of claim 6, wherein the first channel is maintained open between a provisioning service and the payment application.

9. The storage medium of claim 6, wherein the instructions further direct the computing device to:
install the payment application onto a secure element, the payment application associated with a specific payment card product;
receive the default PPSE entry for the specific payment card product; and
store the default PPSE entry in a non-volatile memory.

10. The storage medium of claim 9, further comprising instructions for a PPSE application programming interface (API) that directs the PPSE response in the second volatile memory to be updated with the new PPSE entry, the PPSE API being callable by the payment application after the payment card profile information is received through the first channel.

11. A method comprising:
provisioning a payment application on a first channel;
maintaining the first channel open between a provisioning service and the payment application;
receiving payment card profile information through the first channel;
storing the payment card profile information in a first volatile memory;
determining whether the payment card profile information includes a new proximity payment system environment (PPSE) entry or does not include the new PPSE entry;
if the payment card profile information includes a new PPSE entry, updating a PPSE response in a second volatile memory with the new PPSE entry;

if the payment card profile information does not include the new PPSE entry, updating the PPSE response in the second volatile memory with a default PPSE entry stored in a non-volatile memory; and communicating, through a second channel and while the first channel is maintained as open between the provisioning service and the payment application, payment information including the updated PPSE response to a POS terminal.

12. The method of claim 11, wherein the first volatile memory is a CLEAR_ON_DESELECT transient memory and the second volatile memory is a CLEAR_ON_RESET transient memory.

13. The method of claim 12, further comprising:

installing the payment application onto a secure element, the payment application associated with a specific payment card product;

receiving the default PPSE entry for the specific payment card product; and storing the default PPSE entry in the non-volatile memory.

14. The method of claim 11, wherein the updating the PPSE response in the second volatile memory with the received new PPSE entry is performed via a PPSE application programming interface (API) that directs the PPSE response in the second volatile memory to be updated with the new PPSE entry, the PPSE API being callable by the payment application after the payment card profile information is received from the provisioning service through the first channel.

15. The method of claim 11, further comprising: flushing the payment card profile information out of the first volatile memory after communicating the payment information to the POS terminal.

* * * * *